(12) United States Patent
Kawabe et al.

(10) Patent No.: US 11,373,333 B2
(45) Date of Patent: Jun. 28, 2022

(54) CALIBRATION APPARATUS AND METHOD FOR IN-VEHICLE CAMERA

(71) Applicant: CLARION CO., LTD., Saitama (JP)

(72) Inventors: Manabu Kawabe, Tokyo (JP); Tsukasa Saito, Saitama (JP); Morihiko Sakano, Tokyo (JP); Nobuyuki Matsuyama, Saitama (JP)

(73) Assignee: CLARION CO., LTD.

( * ) Notice: Subject to any disclaimer, the term of this patent is extended or adjusted under 35 U.S.C. 154(b) by 158 days.

(21) Appl. No.: 16/634,444

(22) PCT Filed: Jul. 17, 2018

(86) PCT No.: PCT/JP2018/026661
§ 371 (c)(1),
(2) Date: Jan. 27, 2020

(87) PCT Pub. No.: WO2019/021876
PCT Pub. Date: Jan. 31, 2019

(65) Prior Publication Data
US 2020/0211224 A1    Jul. 2, 2020

(30) Foreign Application Priority Data

Jul. 28, 2017   (JP) .............................. JP2017-146551

(51) Int. Cl.
*G06T 7/80* (2017.01)
*G06T 7/70* (2017.01)
*G06V 20/56* (2022.01)

(52) U.S. Cl.
CPC ............... *G06T 7/80* (2017.01); *G06T 7/70* (2017.01); *G06V 20/56* (2022.01)

(58) Field of Classification Search
CPC ... G06T 7/80; G06T 7/70; G06T 2207/30252; G06T 2207/30244; G06T 2207/10016;
(Continued)

(56) References Cited

U.S. PATENT DOCUMENTS

2009/0290032 A1* 11/2009 Zhang ................... B60R 1/00
                                                      348/211.9
2013/0135474 A1*  5/2013 Sakano ............ G06K 9/00791
                                                      348/148
(Continued)

FOREIGN PATENT DOCUMENTS

JP          9-322052 A      12/1997
WO     WO 2012/139636 A1   10/2012
WO     WO 2017/122552 A1    7/2017

OTHER PUBLICATIONS

International Search Report with English translation, and Written Opinion of corresponding PCT/JP2018/026661, dated Oct. 9, 2018, 6 pages.
(Continued)

*Primary Examiner* — Emily C Terrell
*Assistant Examiner* — Molly Wilburn
(74) *Attorney, Agent, or Firm* — Lewis Roca Rothgerber Christie LLP

(57) ABSTRACT

There are provided a calibration apparatus and method capable of obtaining a high-precision calibration result by taking out only feature points on a road surface from images captured by an in-vehicle camera which is a calibration target. A road surface range is estimated by using feature points appearing in an image(s) captured by a camera (a front camera 102 or a rear camera 103) that is not a camera on which the calibration is executed (a side camera 106); and the calibration is executed by using only feature points existing within the estimated road surface range from among the feature points appearing in an image(s) captured by the camera on which the calibration is executed.

9 Claims, 6 Drawing Sheets

(58) Field of Classification Search
CPC ... G06K 9/00791; H04N 5/247; H04N 17/002
See application file for complete search history.

(56) References Cited

U.S. PATENT DOCUMENTS

| | | | | |
|---|---|---|---|---|
| 2013/0250114 A1* | 9/2013 | Lu | ....................... | H04N 5/2621 |
| | | | | 348/148 |
| 2014/0085469 A1* | 3/2014 | Sakano | ................ | H04N 17/002 |
| | | | | 348/148 |
| 2020/0143710 A1* | 5/2020 | Zhou | ..................... | H04W 4/021 |
| 2021/0105420 A1* | 4/2021 | Lu | ............................ | B60R 1/00 |

OTHER PUBLICATIONS

Extended European Search Report dated Mar. 24, 2021 for corresponding European counterpart Application No. 18837421.9 7 pages).
Guillermo Paya-Vaya et al: "Towards a Common Software/Hardware Methodology for Future Advanced Driver Assistance Systems : The DESERVE Approach",, Jan. 31, 2017 (Jan. 31, 2017), XP055529984, Aalborg ISBN: 978-87-9351-914-5.

\* cited by examiner

CALIBRATION APPARATUS AND METHOD FOR IN-VEHICLE CAMERA

CROSS-REFERENCE TO RELATED APPLICATION(S)

This application is a U.S. National Phase Patent Application and claims priority to and the benefit of International Application Number PCT/JP2018/026661, filed on Jul. 17, 2018, which claims priority of Japanese Patent Application Number 2017-146551, filed on Jul. 28, 2017, the entire contents of all of which are incorporated herein by reference.

TECHNICAL FIELD

The present invention relates to a calibration apparatus and method for automatically calibrating external parameters of an in-vehicle camera.

BACKGROUND ART

In recent years, vehicle control such as automatic parking and automatic driving by using an in-vehicle camera(s) (hereinafter sometimes simply referred to as the camera(s)) which are mounted in a vehicle such as an automobile has been under consideration. In order to control the vehicle by using images captured by the camera, it is necessary to find external parameters such as a mounting position and a mounting angle of the camera precisely; however, physical mounting precision is not enough to perform the vehicle control.

Also, when loads such as humans who get on the vehicle and baggage loaded into the vehicle change, the vehicle body moves up or down or an inclination of the vehicle body changes. Accordingly, the position of the camera changes and the inclination or direction of the camera changes.

According to the conventional technology, the external parameter(s) of the camera is found by mounting the camera at the vehicle and measuring then the external parameter(s) at a measurement location with a floor face to which an already-known pattern is applied; however, in order to carry out such a method, it is necessary to mount the camera at the vehicle and then carry the vehicle with the camera mounted thereon into the measurement location and, therefore, it requires heavy workload. Additionally, the above-described method cannot deal with any change of the external parameter caused by the change of the loads on the vehicle.

Therefore, a method for calibrating the external parameters of the camera while the vehicle is running has come to be used.

As the method for calibrating the external parameters of the in-vehicle camera while the vehicle is running, PTL 1 mentioned below proposes a method for tracking a plurality of detected feature points in images, which are input from a camera, and estimating the external parameters of the camera from time-series coordinate positions of the feature points.

CITATION LIST

Patent Literature

PTL 1: WO2012/139636

SUMMARY OF THE INVENTION

Problems to be Solved by the Invention

Meanwhile, the above-mentioned method described in PTL 1 is on the premise that the feature points to be used are on the same height as that of the road surface such as road surface paint. However, the feature points appearing in a camera image are not always located at the same height as that of the road surface and the feature points such as walls, guard rails, and surrounding houses are also captured; and if the calibration is performed by using these feature points, misalignment may be caused in the calibration result. Furthermore, particularly regarding a side camera which is installed on a side face of the vehicle and captures images of an area on a lateral side of the vehicle, in a case where feature points with different heights are aligned and in a case where a pitch angle of the camera is misaligned, the feature points appear to follow similar tracks, which results in the problem of difficulty in distinguishing the above-described cases from one another.

For example, in the environment of the vehicle illustrated in FIG. 6, the in-vehicle camera detects and tracks not only feature points on the road surface, but also feature points appearing on a wall. Particularly regarding the side camera which is installed on the side face of the vehicle body, the wall appears in most of its visual field range, so that many feature points on the wall surface will be obtained (see particularly an upper diagram in FIG. 6). When these obtained feature points are mapped onto a bird's-eye image (an image of the vehicle as if it were looked down directly from above), points at which straight lines connecting the camera and the feature points intersect with the road surface are treated as feature points. Since these feature points are recognized to move on the road surface as illustrated in a lower diagram in FIG. 6, they are observed as if they were moving at faster speeds than the vehicle's speed. If a plurality of feature points with different heights exist on the wall surface, they are observed as having different apparent moving speeds due to their positions (heights). If the calibration is performed based on the movements of these feature points, the same situation as the misalignment of the pitch angle of the side camera occurs, so that the calibration result which is different from the original pitch angle will be obtained.

Therefore, when performing the calibration of the camera, it is necessary to exclude the feature points having heights from the road surface; however, in the environment illustrated in FIG. 6, both the pitch angle misalignment and the feature points having the heights show apparently the same movements, so that they cannot be distinguished one from another.

The present invention was devised in light of the above-described circumstances and it is an object of the invention to provide a calibration apparatus and method capable of taking out only feature points on the road surface from an image captured by an in-vehicle camera, which is a calibration target, and obtaining a high-precision calibration result.

Means to Solve the Problems

In order to solve the above-described problems, a camera calibration apparatus according to the present invention is a calibration apparatus for executing calibration of an external parameter for a plurality of in-vehicle cameras in an in-vehicle camera system waiting for input from the plurality of in-vehicle cameras, wherein a road surface range is estimated by using a feature points appearing in an image captured by one or more in-vehicle cameras that are not an in-vehicle camera on which the calibration is executed; and wherein the calibration is executed by using only a feature points existing within the estimated road surface range from among feature points appearing in an image captured by the in-vehicle camera on which the calibration is executed.

Furthermore, a camera calibration apparatus according to the present invention is a calibration apparatus for executing calibration of an external parameter for a plurality of in-vehicle cameras in an in-vehicle camera system having input from the plurality of in-vehicle cameras, the calibration apparatus comprising: a first feature point detection unit that detects first feature points appearing in an image captured by a calibration nontarget in-vehicle camera that is not a calibration target in-vehicle camera on which the calibration is executed; a first feature point tracking unit that tracks the first feature points from images captured by the calibration nontarget in-vehicle camera at different times of day; a feature point height calculation unit that calculates a height of each of the first feature points from a moved distance or a moving speed of the tracked first feature point; a road surface range estimation unit that estimates, as a road surface range, a range where the first feature point having the same height as that of a road surface exists, from among the first feature points; a road surface range setting unit that sets the estimated road surface range as a road surface range for the calibration target in-vehicle camera; a second feature point detection unit that detects second feature points appearing in an image captured by the calibration target in-vehicle camera on which the calibration is executed; a second feature point tracking unit that tracks the second feature points from images captured by the calibration target in-vehicle camera at different times of day; a feature point sorting unit that sorts out the second feature points existing within the road surface range from the tracked second feature points; and a calibration operation unit that executes the calibration of the calibration target in-vehicle camera from only the second feature points existing within the road surface range.

Furthermore, a camera calibration method according to the present invention is a calibration method for executing calibration of an external parameters for a plurality of in-vehicle cameras in an in-vehicle camera system waiting for input from the plurality of in-vehicle cameras, wherein a road surface range is estimated by using a feature point appearing in an image captured by one or more in-vehicle cameras that are not an in-vehicle camera on which the calibration is executed; and wherein the calibration is executed by using only a feature point existing within the estimated road surface range from among feature points appearing in an image captured by the in-vehicle camera on which the calibration is executed.

Advantageous Effects of the Invention

Regarding the calibration of the side camera in a scene where many feature points can be captured on, for example, a wall surface other than the road surface, a high-precision calibration result can be obtained according to the present invention by appropriately taking out only the feature points on the road surface. Consequently, it becomes possible to enhance safety of, for example, automatic driving using the images captured by the in-vehicle camera(s).

The problems, configurations, and advantageous effects other than those described above will become clear from the description of the embodiments below.

DESCRIPTION OF EMBODIMENTS

An embodiment of the present invention will be explained below in detail with reference to the drawings.

Figure 1:
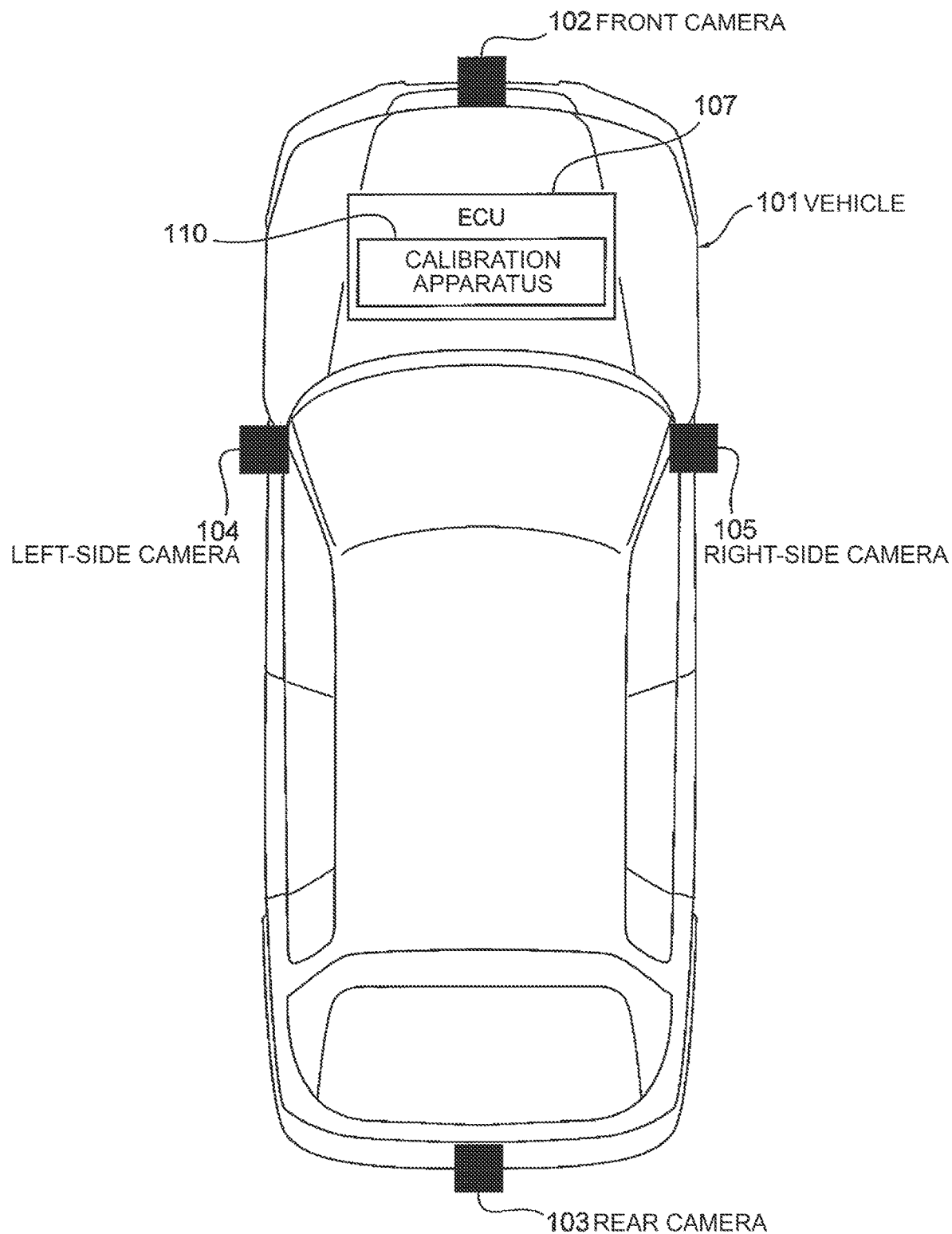
FIG. 1 is an outline configuration diagram illustrating a system configuration of an in-vehicle camera system to which an embodiment of a calibration apparatus according to the present invention is applied.

FIG. 1 is an outline configuration diagram illustrating a system configuration of an in-vehicle camera system to which an embodiment of a calibration apparatus according to the present invention is applied.

In the embodiment illustrated in the drawing, four cameras 102 to 105 are mounted on a vehicle 101 and are installed at, for example, the front side, the rear side, the right side, and the left side of a vehicle body of the vehicle 101. A front camera 102 which is installed on a front face of the vehicle body of the vehicle 101 captures and generates images of an area in front of the vehicle body; a rear camera 103 which is installed on a rear face of the vehicle body of the vehicle 101 captures and generates images of an area behind the vehicle body; a left-side camera 104 which is installed on a left side face of the vehicle body of the vehicle 101 captures and generates images of an area on the left side of the vehicle body; and a right-side camera 105 which is installed on a right side face of the vehicle body of the vehicle 101 captures and generates images of an area on the right side of the vehicle body. Each camera 102 to 105 is usually mounted in a manner such that an optical axis will face a direction extending from in parallel with a horizontal plane, which is parallel to the road surface (ground), to vertically below the horizontal plane. Also, for example, a wide angle fish-eye camera is adopted for each camera 102 to 105 so that images of the entire surrounding area around the vehicle 101 can be obtained.

Incidentally, it is a matter of course that the number of the cameras mounted on the vehicle 101 and their positions, etc. are not limited to those in the example illustrated in the drawing.

The vehicle 101 is equipped with an ECU 107 as a processing apparatus for receiving and processing the images captured by each camera 102 to 105. This ECU 107 is composed of a microcomputer including: a CPU as an arithmetic unit for performing various kinds of arithmetic operation processing based on programs and so on; a RAM storing image data captured by each camera 102 to 105; and a ROM storing programs for executing various kinds of arithmetic operation processing (for example, the calibration of external parameters for the cameras as described later) and information required for the programs.

In this embodiment, the above-described ECU 107 has a calibration apparatus 110 built in for automatically calibrating the external parameters for each camera 102 to 105 by using the images captured by each camera 102 to 105, for example, while the vehicle 101 is running.

When performing the calibration of each camera 102 to 105 as described earlier, it is necessary to exclude the feature points having heights from the road surface such as walls, guard rails, and surrounding houses from the feature points appearing in the images captured by the camera 102 to 105 which is a calibration target. In order to solve this, information (images) of the front camera 102 capable of photographing the area in front of the vehicle body is used in this embodiment. The same can be performed even when using information (images) of the rear camera 103 capable of photographing the area behind the vehicle body; however, in this embodiment, the following explanation will be provided regarding the operation using the information (images) of the front camera 102.

The front camera 102 has acquired feature points in front of the vehicle body and, in most cases except when making a turn, is capable of capturing the road surface in a traveling direction of the vehicle 101 while the vehicle 101 is running. When the calibration of the front camera 102 is correct, the feature points on the road surface move backwards at the same speed as the vehicle speed of the vehicle 101 in a bird's-eye image, while the feature points on, for example, a wall surface, whose heights are at positions different from that of the road surface are recognized as moving at faster speeds than the vehicle speed of the vehicle 101 as described earlier.

Specifically speaking, regarding the front camera 102, the calibration of a camera angle can be performed by using only the feature points on the road surface in front of the vehicle body (the feature points detected in images captured by the front camera 102). Also, the road surface range can be estimated from moved distances and moving speeds of the feature points after the calibration (as described later in detail). Meanwhile, the left-side camera 104 and the right-side camera 105 acquire feature points in areas on lateral sides of the vehicle body and tend to acquire many feature points, for example, on a wall surface, which have heights located at positions different from the height of the road surface. Therefore, this embodiment is designed to perform the calibration of the camera angle by using the information (images) of the front camera 102, excluding and discarding the above-described feature points (the feature points with heights located at positions different from the height of the road surface) from the feature points appearing in the images captured by the left-side camera 104 and the right-side camera 105, and selecting only the feature points on the road surface.

Incidentally, when the vehicle 101 making a turn, the area in front of the vehicle body may not always be the road surface; however, turning of the vehicle 101 can be detected by acquiring vehicle information such as a steering angle of a steering wheel, so that in that case, it is possible to deal with the situation by stopping the acquisition of the feature points.

Figure 2:
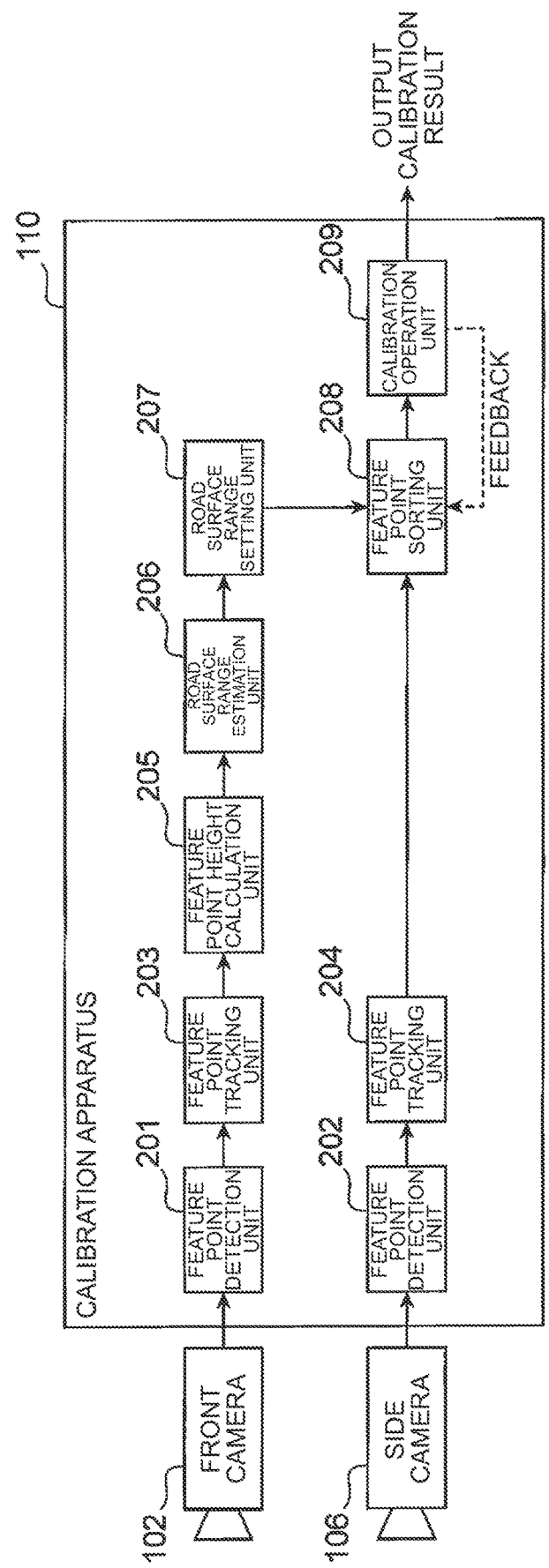
FIG. 2 is a block diagram illustrating an internal configuration of an embodiment of the calibration apparatus according to the present invention.
Figure 3:
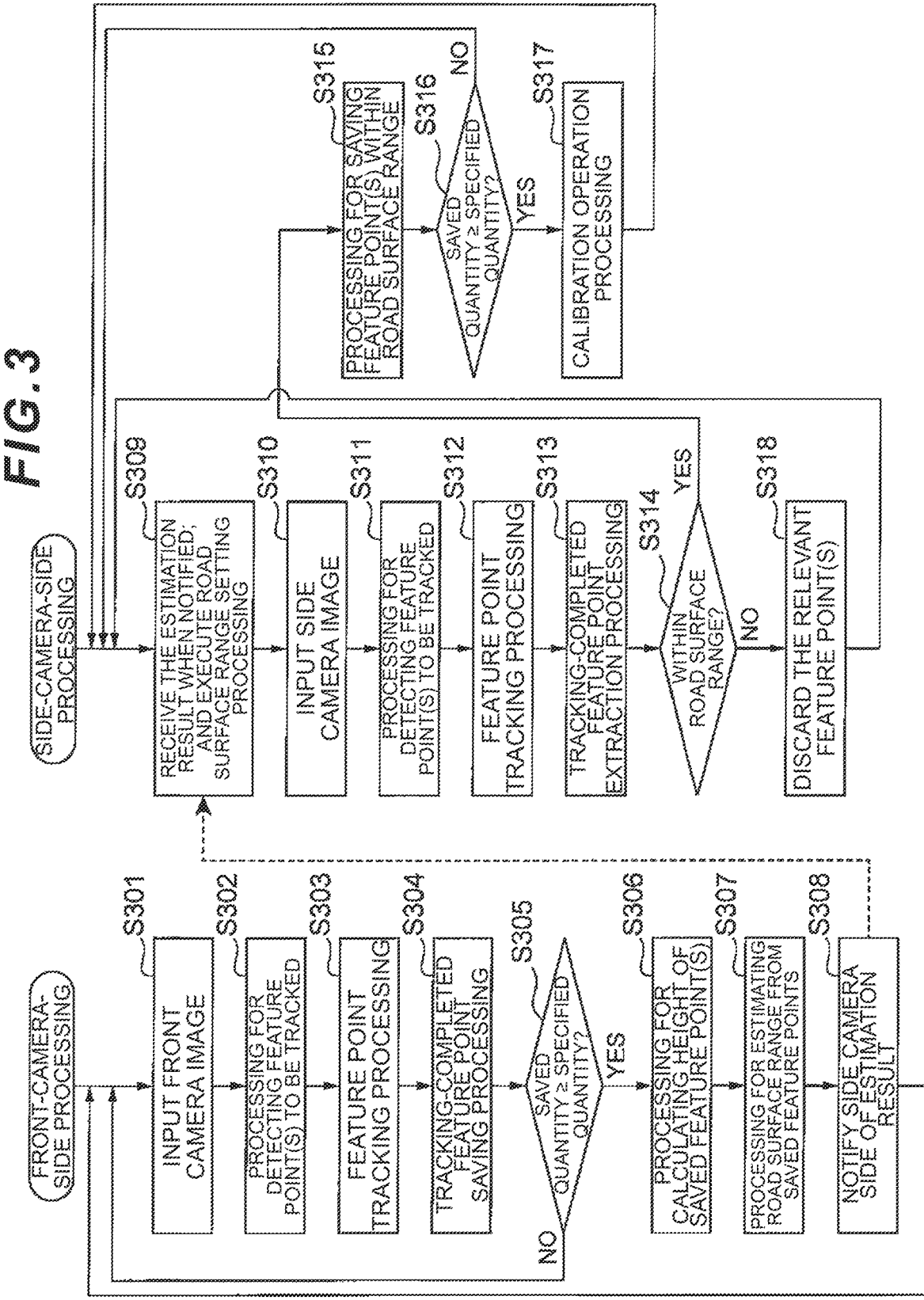
FIG. 3 is a flowchart for explaining a processing flow of an embodiment of the calibration apparatus according to the present invention.

The details of the calibration by the calibration apparatus 110 according to this embodiment described above, particularly, the details of the calibration of the left-side camera 104 or the right-side camera 105 by the calibration apparatus 110 will be explained by using FIGS. 2 and 3. FIG. 2 is a block diagram illustrating an internal configuration of the calibration apparatus 110 illustrated in FIG. 1; and FIG. 3 is a flowchart for explaining a processing flow by the calibration apparatus 110 illustrated in FIG. 1.

Referring to FIG. 2, the calibration apparatus 110 is basically configured by including: a feature point detection unit (a first feature point detection unit) 201 that detects feature points (first feature points) from images captured by the front camera 102; a feature point detection unit (a second feature point detection unit) 202 that detects feature points (second feature points) from images captured by the side camera 106 (the left-side camera 104 or the right-side camera 105); a feature point tracking unit (a first feature point tracking unit) 203 that tracks the feature points in the images captured by the front camera 102; a feature point tracking unit (a second feature point tracking unit) 204 that tracks the feature points in the images captured by the side camera 106; a feature point height calculation unit 205 that calculates the heights of the feature points in the images captured by the front camera 102; a road surface range estimation unit 206 by the front camera 102; a road surface range setting unit 207 that determines a feature point range (that is, the road surface range) to be adopted for the calibration of the side camera 106; a feature point sorting unit 208 that sorts out the feature points to be adopted for the calibration of the side camera 106; and a calibration operation unit 209 that executes the calibration of the side camera.

Incidentally, needless to provide any detailed explanation, regarding the above-described calibration apparatus 110, the feature point detection unit 201 on the front camera 102 side and the feature point detection unit 202 on the side camera 106 side may be shared and the feature point tracking unit 203 on the front camera 102 side and the feature point tracking unit 204 on the side camera 106 side may be shared.

The above-described calibration apparatus 110 executes processing on the front camera 102 side and processing on the side camera 106 side almost at the same time; however, in the following explanation, the operation on the front camera 102 side will be firstly explained.

After an image is input from the front camera 102 to the calibration apparatus 110 (S301 in FIG. 3), that image is input to the feature point detection unit 201 and feature points are extracted (detected) from that image (S302 in FIG. 3). The feature points herein used mean places (points) which can easily be identified as the same points in a plurality of images, and include, for example, corner points of the road surface paint. This feature point detection processing is executed by using known detection technology.

Coordinates of the feature points detected by the feature point detection unit 201 are sent to the feature point tracking unit 203. The feature point tracking unit 203 tracks the same feature point from images captured by the front camera 102 at different times of day (time-series images) (S303 in FIG. 3). This feature point tracking processing over the plurality of times of day is executed by using known tracking technology.

After the tracking by the feature point tracking unit 203 is completed, the coordinates of the obtained feature points (tracking-completed feature points) are saved (S304 in FIG. 3) and also sent to the feature point height calculation unit 205. The feature point height calculation unit 205 judges whether the number of the obtained feature points (that is, a saved quantity) has reached a predetermined specified quantity or not (S305 in FIG. 3); and if the saved quantity has reached the specified quantity, the coordinates of the feature points undergo bird's-eye view transformation and are transformed to coordinates on the road surface. Furthermore, the feature point height calculation unit 205: calculates the height of the relevant feature point from a moved distance or a moving speed of the coordinates on the road surface on the basis of a vehicle speed obtained from a vehicle speed sensor or a wheel speed sensor mounted on the vehicle 101 (S306 in FIG. 3); judges whether the relevant feature point truly exists on the road surface or not (in other words, whether the feature point has the same height as that of the road surface or not); and sends the judgment result to the road surface range estimation unit 206.

Figure 4:
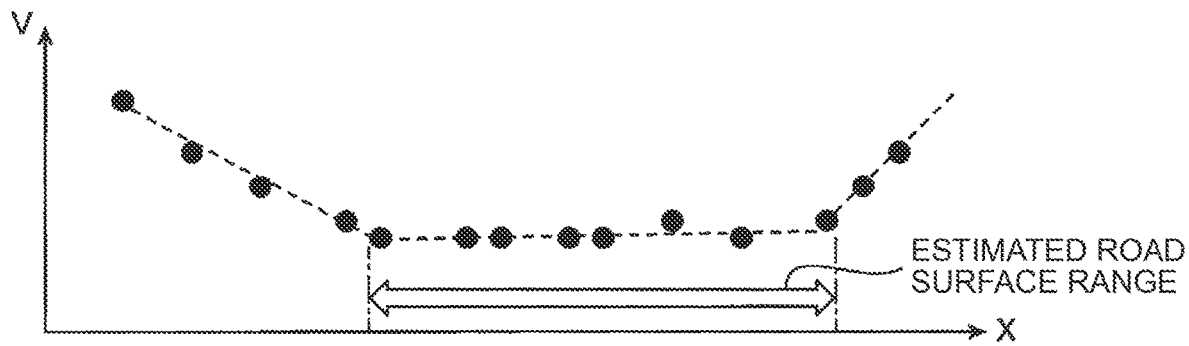
FIG. 4 is a diagram for explaining an example of processing by a road surface range estimation unit and a road surface range setting unit.
Figure 4:
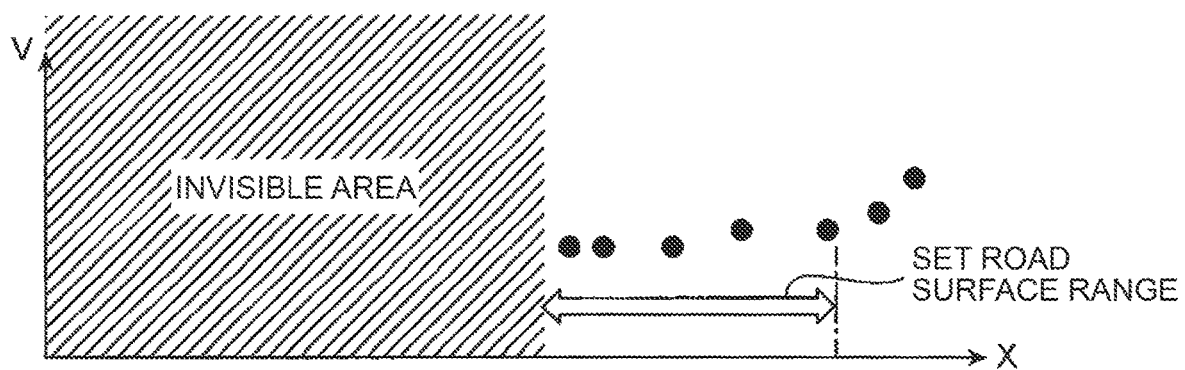

The detection of the feature points by the feature point detection unit 201 and the tracking of the feature points by the feature point tracking unit 203 are performed not only once, but continuously every time an image is input from the front camera 102 as described earlier. The judgment results of the feature points detected and tracked during a certain period of time (the judgment results by the feature point height calculation unit 205) are accumulated in the road surface range estimation unit 206. The road surface range estimation unit 206 estimates that a distribution range of the feature points which are judged from the above results to be located on the road surface (that is, the feature points having the same height as that of the road surface) is on the road surface (the road surface range) (S307 in FIG. 3)(see an upper diagram of FIG. 4).

The estimation result by the road surface range estimation unit 206 is sent to the road surface range setting unit 207 and the side camera 106 side is informed to that effect (S308 in FIG. 3); and the road surface range setting unit 207 determines (sets) a range to be judged as the road surface on the side camera 106 side (S309 in FIG. 3). Under this circumstance, the side camera 106 is in a state before the calibration, so that an error occurs in the coordinates after the bird's-eye view transformation and, therefore, the road surface range is set in consideration of an error range. Specifically speaking, since a wide-angle fish-angle camera is usually adopted for the relevant side camera 106 and an invisible area exists in the relevant side camera 106, the range is usually set by removing a certain proportion or a certain length from an edge of the road surface range (see a lower diagram of FIG. 4).

The setting of the road surface range by this road surface range setting unit 207 is updated periodically.

Next, the operation of the side camera 106 side will be explained.

Regarding the side camera 106, the feature points are detected and tracked in the same manner as with the front camera 102.

After an image is input from the side camera 106 to the calibration apparatus 110 (S310 in FIG. 3), that image is input to the feature point detection unit 202 and feature points are detected from that image (S311 in FIG. 3). This feature point detection processing is similar to the detecting method executed by the feature point detection unit 201 on the front camera 102 side.

Coordinates of the feature points detected by the feature point detection unit 202 are sent to the feature point tracking unit 204. The feature point tracking unit 204 tracks the same feature point from images captured by the side camera 106 at different times of day (S312 in FIG. 3). The tracking processing by this feature point tracking unit 204 is also similar to the tracking processing executed by the feature point tracking unit 203 on the front camera 102 side.

The coordinates of the feature points regarding which the tracking by the feature point tracking unit 204 is completed (tracking-completed feature points) are sent to the feature point sorting unit 208. The feature point sorting unit 208 extracts the coordinates of the feature point, which are then transformed to coordinates in a bird's-eye image (S313 in FIG. 3). Furthermore, the feature point sorting unit 208: judges whether or not the coordinates in this bird's-eye image match the road surface range which is sent from the road surface range setting unit 207 (that is, whether such coordinates exist within the road surface range or not) (S314 in FIG. 3); and sorts out only the coordinates within the road surface range (the feature points having such coordinates) and sends them to, and saves them in, the calibration operation unit 209 (S315 in FIG. 3). Incidentally, the feature points which are determined to not exist within the road surface range are discarded (S318 in FIG. 3).

The calibration operation unit 209 judges whether the number of the feature points sorted out and saved by the feature point sorting unit 208 (the feature points within the road surface range) (that is, a saved quantity) has reached a predetermined specified quantity or not (S316 in FIG. 3); and if the saved quantity has reached the specified quantity, the calibration operation unit 209 performs the calibration of the side camera 106 by using the feature points (the feature points within the road surface range) (S317 in FIG. 3). The calibration operation processing by this calibration operation unit 209 is executed in accordance with the following procedures.

Specifically speaking, when the calibration is performed correctly, the moved distance of the feature point matches a travel distance of the vehicle 101 in the bird's-eye view coordinates. Moreover, if the vehicle 101 is moving straight ahead, the feature point moves straight backwards. If there is an error in the pitch angle of the side camera 106, the feature point moves obliquely or the moved distance of the feature point becomes different from the moved distance of the vehicle 101. If an angle used for the bird's-eye view transformation is changed by a minute amount, the position of the feature point at the bird's-eye view coordinates changes, so that the moving direction and the moved distance of the feature point change.

If the pitch angle of the side camera 106 changes, mainly the moved distance of the feature point changes. Therefore, if the pitch angle used for the calculation to execute the bird's-eye view transformation processing is changed by minute amounts and an angle to make the moved distance of the feature point match the moved distance of the vehicle 101 is thereby found, that pitch angle can be estimated as a right pitch angle.

Furthermore, if not only one feature point, but a plurality of feature points exist which are detected and tracked in images captured by the side camera 106, the calibration of the side camera 106 can be performed by finding the difference between the moved distance of each feature point and the moved distance of the vehicle 101, recognizing the total sum of such absolute values or the total sum of squared errors as an evaluation value, and finding a pitch angle which makes the evaluation value minimum.

The above-described calculation of the calibration can be performed only once, but the precision can be enhanced by repeatedly executing the calculation. This can be implemented by feeding back the first calibration result of the calibration operation unit 209 to the feature point sorting unit 208.

With the feature point sorting unit 208, it is necessary to transform the coordinates of the feature points to the bird's-eye view coordinates before sorting out the feature points as described earlier; however, if the calibration has never been performed, for example, a design value is used. Since this angle includes a large error, there is a possibility that the feature point(s) may be mistakenly selected due to the influence of the error when sorting out the feature points. Specifically speaking, a feature point(s) which exists on the road surface, but is located close to the edge of the road surface may sometimes be removed during the sorting; or a feature point(s) which is located out of the road surface, but close to the road surface may sometimes be mistakenly selected. Such selection mistakes may cause an error in the calibration result of the calibration operation unit 209.

Even if the error is caused in the calibration result of the calibration operation unit 209, its reliability is higher than angle information before the calibration. Therefore, it is possible to reduce the selection mistake by using the angle of the calibration result of the calibration operation unit 209 for the bird's-eye view transformation for sorting out the feature points of the feature point sorting unit 208.

Specifically speaking, the second calibration is performed by feeding back the calibration result of the calibration operation unit 209 to the feature point sorting unit 208 and sorting out the feature points again. Alternatively, the newly obtained feature points are sorted out by making them undergo the bird's-eye view transformation with the angle after the feedback. As a result, a higher-precision result can be obtained by the second calibration.

The calibration result with much higher precision can be obtained by repeating the above-described calibration and the feedback.

After repeating the calibration a certain number of times or during a certain period of time in the above-described manner, the calibration operation unit 209 outputs the last calibration result.

Incidentally, the above-described embodiment has described the operation on the premise that the front camera 102 exists; however, if the front camera 102 does not exist, similar operation can be performed by using the rear camera 103. If automatic driving based on images captured by the camera(s) is assumed, the front camera 102 for monitoring the area in front of the vehicle is indispensable; however, if only assistance of the driver's driving is assumed and in a case of an in-vehicle camera system equipped with only the rear camera 103 for monitoring the area behind the vehicle, which is a blind area for the driver, and the side camera(s) 106 (the left-side camera 104 and/or the right-side camera 105) for monitoring areas on the lateral sides of the vehicle, the calibration similar to that of the above-described embodiment can be implemented by using the rear camera 103.

Furthermore, a plurality of side cameras 106 normally exist. In this case as well, the calibration of the plurality of side cameras can be performed at the same time by conducting the road surface range judgment by using images captured by the front camera 102 and transferring the road surface range estimation result to each of the plurality of side cameras. Incidentally, for the purpose of reduction of the loadage of the ECU 107 as an arithmetic unit or for the purpose of reduction of the power consumption, it is also possible to execute the calibration of the plurality of side cameras sequentially, but not at the same time.

Figure 5:
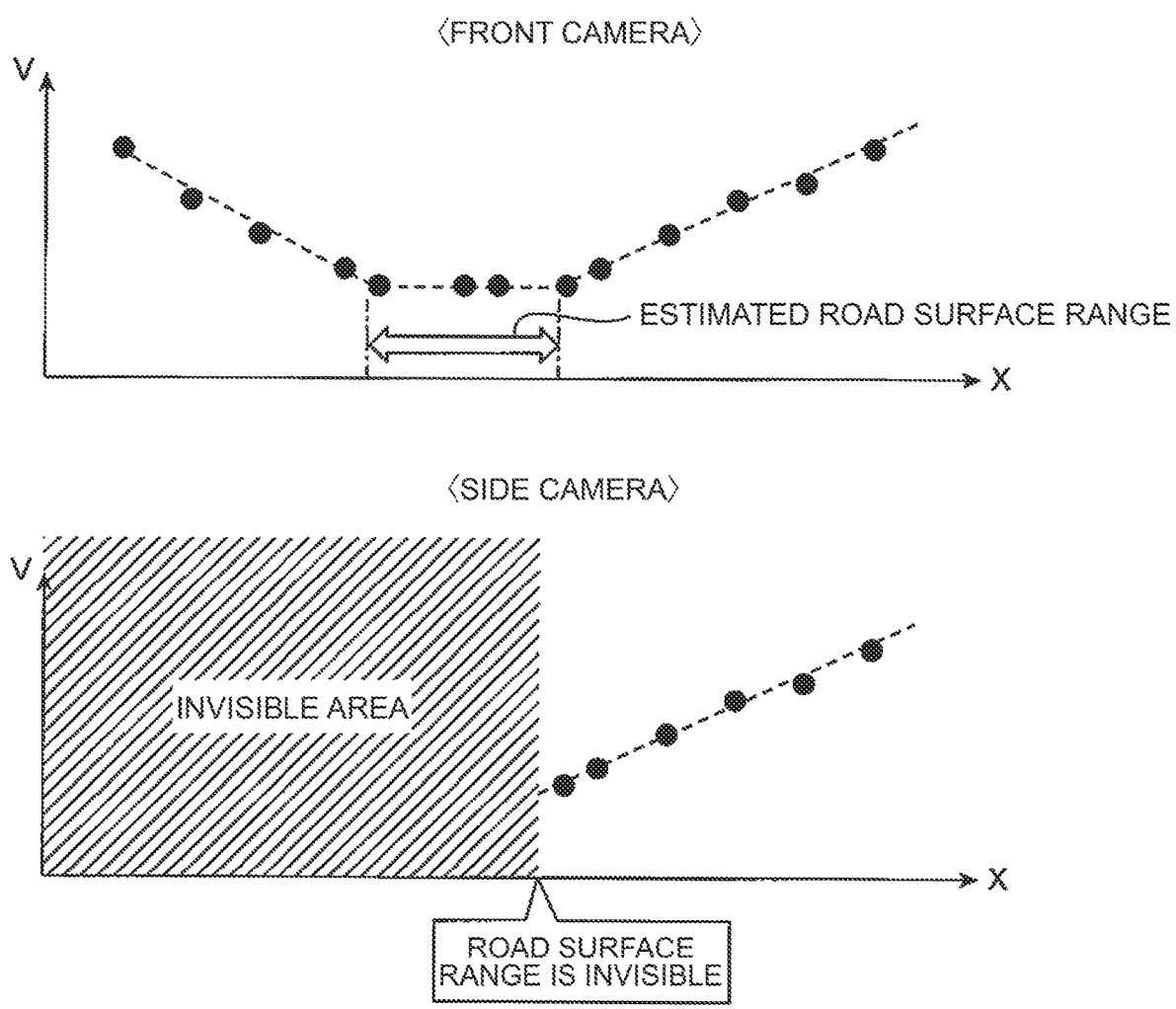
FIG. 5 is a diagram for explaining another example of processing by the road surface range estimation unit and the road surface range setting unit.
Figure 6:
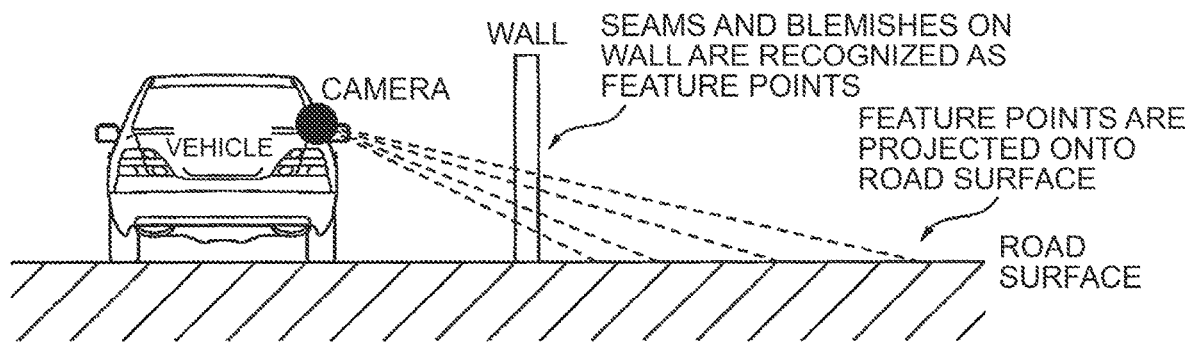
FIG. 6 is a diagram illustrating an example of an ambient environment of a vehicle and feature points appearing in images captured by an in-vehicle camera.
Figure 6:
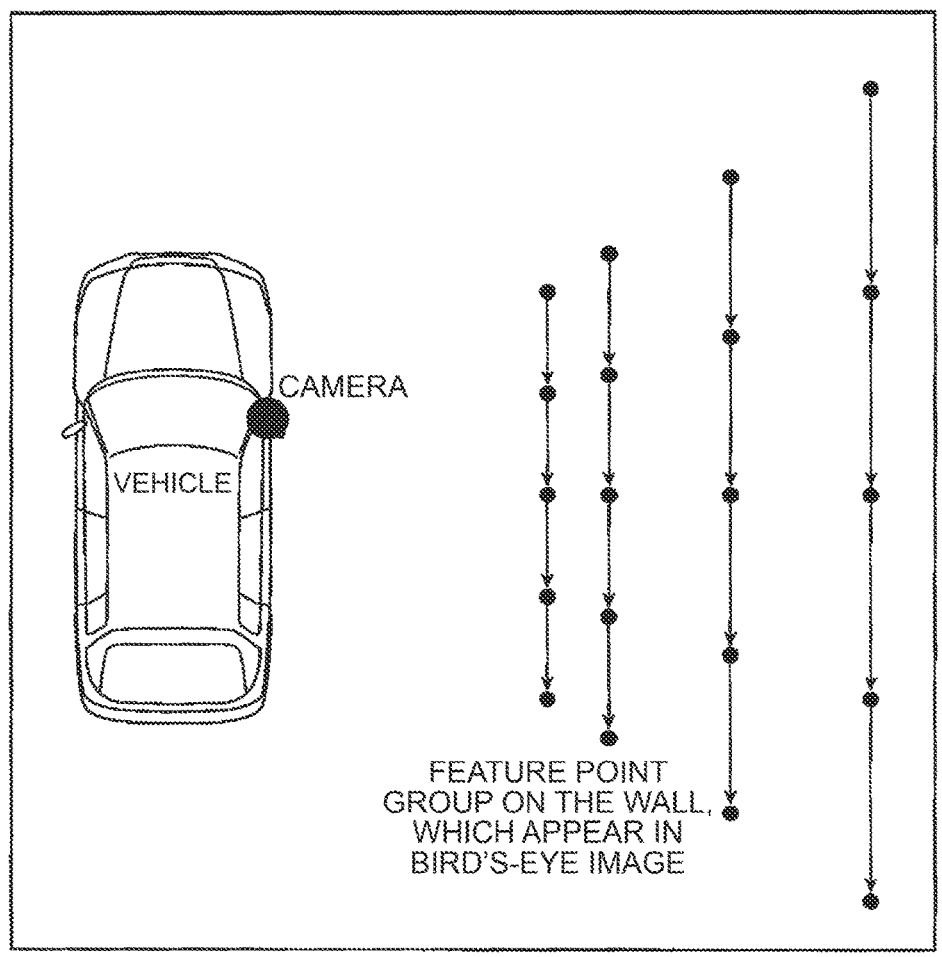

Furthermore, a camera for which the road surface range is invisible in the image (see FIG. 5) can be selected based on the road surface range estimation by using the image captured by the front camera 102. In this case, it is possible to reduce the throughput and reduce the power consumption by stopping the entire processing of the camera for which the road surface area is invisible. Furthermore, some extra processing capacity is produced by stopping the processing of the camera for which the road surface area is invisible, it is also possible to further enhance safety by, for example, using that processing capacity for the calibration of other cameras or distributing that processing capacity to other processing such as calculation for the automatic driving.

The calibration apparatus 110 according to this embodiment as explained above executes the calibration by estimating the road surface range by using feature points appearing in an image(s) captured by a camera (the front camera 102 or the rear camera 103) that is not a camera for which the calibration is executed (the side camera 106), and by using only feature points existing within the estimated road surface range from among the feature points appearing in the image(s) captured by the camera for which the calibration is executed; and, therefore, regarding the calibration of the side camera 106 in a scene where many feature points are captured on, for example, a wall surface other than the road surface, a high-precision calibration result can be obtained by appropriately taking out only the feature points on the road surface. As a result, it is possible to enhance the safety of, for example, the automatic driving by using the images captured by each camera.

Incidentally, the present invention is not limited to the aforementioned embodiment, and includes various variations. For example, the aforementioned embodiment has been described in detail in order to explain the invention in an easily comprehensible manner and is not necessarily limited to the embodiment having all the configurations explained above.

Furthermore, each of the aforementioned configurations, functions, processing units, processing means, etc. may be implemented by hardware by, for example, designing part or all of such configurations, functions, processing units, and processing means by using integrated circuits or the like. Moreover, each of the aforementioned configurations, functions, etc. may be realized by software by processors interpreting and executing programs for realizing each of the functions. Information such as programs, tables, and files for realizing each of the functions may be retained in memories, storage devices such as hard disks and SSDs (Solid State Drives), or storage media such as IC cards, SD cards, and DVDs.

Furthermore, control lines and information lines which are considered to be necessary for the explanation are illustrated; however, not all control lines or information lines are necessarily indicated in terms of products. Practically, it may be assumed that almost all components are connected to each other.

REFERENCE SIGNS LIST

101: vehicle
102: front camera
103: rear camera
104: left-side camera
105: right-side camera
106: side camera
107: ECU
110: calibration apparatus
201: feature point detection unit (first feature point detection unit)
202: feature point detection unit (second feature point detection unit)
203: feature point tracking unit (first feature point tracking unit)
204: feature point tracking unit (second feature point tracking unit)
205: feature point height calculation unit
206: road surface range estimation unit
207: road surface range setting unit
208: feature point sorting unit
209: calibration operation unit

The invention claimed is:

1. A calibration apparatus of a vehicle for executing calibration of an external parameter for a first in-vehicle camera in an in-vehicle camera system having input from a plurality of in-vehicle cameras, the calibration apparatus comprising a processor and memory,
wherein the processor estimates a road surface range, as a range for a road surface on which the vehicle travels on, by using a feature point appearing in an image captured by one or more in-vehicle cameras that are different from the first in-vehicle camera;
wherein the processor calculates heights of the feature points appearing in the image captured by one or more in-vehicle cameras;
wherein the processor estimates the road surface range by excluding feature points that have a height higher than a height of the road surface, based on the calculated heights of the feature points appearing in the image captured by one or more in-vehicle cameras;
wherein the processor determines whether a feature point appearing in an image captured by the first in-vehicle camera is within the estimated road surface range; and
wherein the calibration is executed by the processor using only a feature point that is determined to be within the estimated road surface range from among feature points appearing in the image captured by the first in-vehicle camera.

2. The calibration apparatus according to claim 1, wherein the processor estimates the road surface range based on a moved distance or a moving speed of the feature point appearing in the image captured by the one or more in-vehicle cameras that are not the first in-vehicle camera.

3. The calibration apparatus according to claim 1, wherein the in-vehicle camera that is different from the first in-vehicle camera is a front camera for capturing images of an area in front of a vehicle or a rear camera for capturing images of an area behind the vehicle.

4. The calibration apparatus according to claim 1, wherein the first in-vehicle is a side camera for capturing images of an area on a lateral side of the vehicle.

5. A calibration apparatus for executing calibration of an external parameter for a first in-vehicle cameras in an in-vehicle camera system having input from the plurality of in-vehicle cameras comprising:
the calibration apparatus comprising a processor and memory, wherein the processor:
detects first feature points appearing in an image captured by a second in-vehicle camera that is different from the first in-vehicle camera;
tracks the first feature points from images captured by the second in-vehicle camera at different times of day;
calculates a height of each of the first feature points from a moved distance or a moving speed of the tracked first feature point;
estimates, as a road surface range for a road surface on which the vehicle travels on, a range where the first feature point having the same height as that of a road surface exists, from among the first feature points, wherein the road surface range excludes feature points that have a height higher than a height of the road surface, based on the calculated heights of the feature points;
sets the estimated road surface range as a road surface range for the first in-vehicle camera;
detects second feature points appearing in an image captured by the first in-vehicle camera;
tracks the second feature points from images captured by the first in-vehicle camera at different times of day;
determines whether any feature point of the second feature points in the image captured by the first in-vehicle camera is within the estimated road surface range; and
executes the calibration of the first in-vehicle camera from only the second feature points that are determined to be within the road surface range.

6. A calibration method for executing calibration of an external parameter for a first in-vehicle camera in an in-vehicle camera system having input from a plurality of in-vehicle cameras,
wherein a road surface range is estimated, as a range for a road surface on which the vehicle travels on, by using a feature point appearing in an image captured by one or more in-vehicle cameras that are different from the first in-vehicle camera;
wherein a calibration apparatus calculates heights of the feature points appearing in the image captured by one or more in-vehicle cameras;
wherein the calibration apparatus estimates the road surface range by excluding feature points that have a height higher than a height of the road surface, based on the calculated heights of the feature points appearing in the image captured by one or more in-vehicle cameras;
wherein the calibration apparatus determines whether a feature point appearing in an image captured by the first in-vehicle camera is within the estimated road surface range; and
wherein the calibration is executed by using only a feature point that is determined to be within the estimated road surface range from among feature points appearing in the image captured by the first in-vehicle camera.

7. The calibration method according to claim 6, wherein the road surface range is estimated based on a moved distance or a moving speed of the feature point appearing in the image captured by the one or more in-vehicle cameras that are not the first in-vehicle camera.

8. The calibration method according to claim 6, wherein the in-vehicle camera that is different from the first in-vehicle camera is a front camera for capturing images of an area in front of a vehicle or a rear camera for capturing images of an area behind the vehicle.

9. The calibration method according to claim 6, wherein the first in-vehicle camera is a side camera for capturing images of an area on a lateral side of the vehicle.

* * * * *